(12) United States Patent
Nagasugi et al.

(10) Patent No.: US 11,770,056 B2
(45) Date of Patent: Sep. 26, 2023

(54) MANUFACTURING METHOD OF LAMINATED IRON CORE

(71) Applicant: MITSUI HIGH-TEC, INC., Fukuoka (JP)

(72) Inventors: Shigeru Nagasugi, Fukuoka (JP); Takashi Fukumoto, Fukuoka (JP); Jin Oda, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 0 days.

(21) Appl. No.: 16/970,186

(22) PCT Filed: Mar. 5, 2019

(86) PCT No.: PCT/JP2019/008661
§ 371 (c)(1),
(2) Date: Aug. 14, 2020

(87) PCT Pub. No.: WO2019/172265
PCT Pub. Date: Sep. 12, 2019

(65) Prior Publication Data
US 2021/0143712 A1  May 13, 2021

(30) Foreign Application Priority Data
Mar. 7, 2018  (JP) .................................. 2018-041009

(51) Int. Cl.
*H02K 15/03* (2006.01)
*H02K 1/276* (2022.01)

(52) U.S. Cl.
CPC ............. *H02K 15/03* (2013.01); *H02K 1/276* (2013.01); *Y10T 29/49012* (2015.01)

(58) Field of Classification Search
CPC ............ H02K 7/04; H02K 15/03; H02K 1/28; H02K 15/02; H02K 15/165; H02K 15/16; H02K 1/27; Y10T 29/49012
(Continued)

(56) References Cited

U.S. PATENT DOCUMENTS 10,848,039 B2 * 11/2020 Nagai .................... H02K 15/03
2010/0154968 A1   6/2010 Shirai et al.
(Continued)

FOREIGN PATENT DOCUMENTS

CN           107086731 A      8/2017
JP           6-78482          3/1994
(Continued)

OTHER PUBLICATIONS

International Search Report issued in International Patent Application No. PCT/JP2019/008661, dated May 7, 2019 and English language translation.
(Continued)

*Primary Examiner* — Thiem D Phan
(74) *Attorney, Agent, or Firm* — GREENBLUM & BERNSTEIN, P.L.C.

(57) ABSTRACT

A manufacturing method of a laminated iron core by laminating a plurality of blanked members to form a laminate, the laminate including a pair of first and second end surfaces and the plurality of blanked members being interlocked by a caulk in a lamination direction of the laminate, includes: forming the laminate such that a protrusion of the caulk protrudes downward from the first end surface being in a downward state; placing the laminate on support such that the protrusion is not in contact with a support surface of the support; and processing the laminate in a state where the laminate is placed on the support.

7 Claims, 10 Drawing Sheets

(58) Field of Classification Search
USPC .................. 29/598, 596, 604, 607, 609, 732
See application file for complete search history.

(56) References Cited

U.S. PATENT DOCUMENTS

| | | |
|---|---|---|
| 2013/0020010 A1 | 1/2013 | Namaike et al. |
| 2013/0249346 A1 | 9/2013 | Nagai et al. |
| 2014/0124980 A1 | 5/2014 | Nagai et al. |
| 2015/0256036 A1 | 9/2015 | Nakamura |
| 2017/0012507 A1 | 1/2017 | Sasaki et al. |
| 2017/0237320 A1 | 8/2017 | Urabe |
| 2017/0307361 A1 | 10/2017 | Kato et al. |
| 2018/0076700 A1 | 3/2018 | Nagai et al. |
| 2019/0097503 A1 | 3/2019 | Ushida et al. |
| 2019/0186902 A1 | 6/2019 | Kato et al. |

FOREIGN PATENT DOCUMENTS

| | | |
|---|---|---|
| JP | 2002-58184 | 2/2002 |
| JP | 2006-197693 | 7/2006 |
| JP | 2006-320088 | 11/2006 |
| JP | 2007-124788 | 5/2007 |
| JP | 2010-143125 A | 7/2010 |
| JP | 2011-55687 A | 3/2011 |
| JP | 2012-34574 | 2/2012 |
| JP | 4991900 | 8/2012 |
| JP | 2013-27205 | 2/2013 |
| JP | 2013-59262 A | 3/2013 |
| JP | 2014-113027 | 6/2014 |
| JP | 2014-204504 | 10/2014 |
| JP | 2016-096634 | * 11/2014 |
| JP | 2015-171288 | 9/2015 |
| JP | 2016-96634 A | 5/2016 |
| JP | 2016-146739 A | 8/2016 |
| JP | 2017-22885 A | 1/2017 |
| JP | 2017-200277 | 11/2017 |
| JP | 2018-42426 A | 3/2018 |
| JP | 2018-68073 A | 4/2018 |
| WO | 2012/105350 | 8/2012 |
| WO | 2015/053368 | 4/2015 |
| WO | 2017/159348 | 9/2017 |

OTHER PUBLICATIONS

Written Opinion of the International Searching Authority issued in International Application No. PCT/JP2019/008661, dated May 7, 2019.

Japanese Document received in Japanese patent application No. 2018-041009 dated May 11, 2021, and English language translation thereof.

* cited by examiner

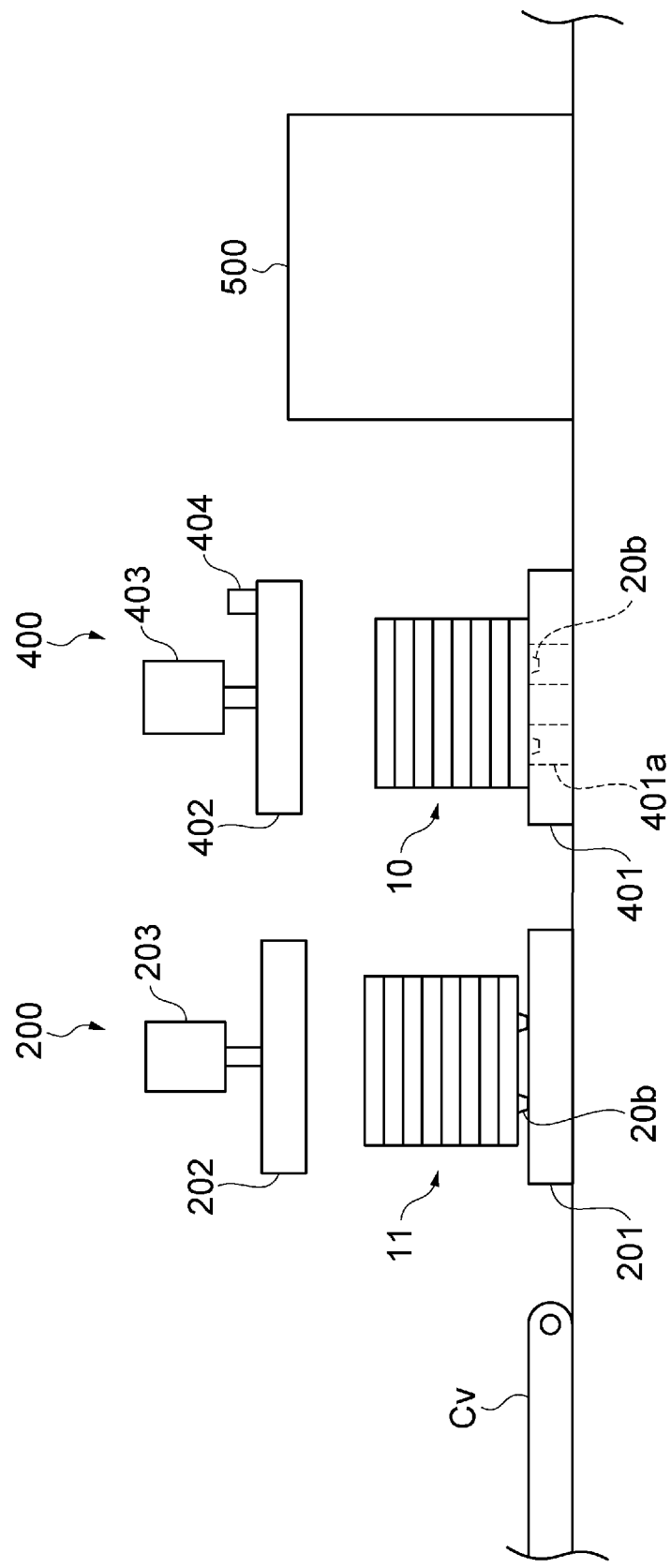

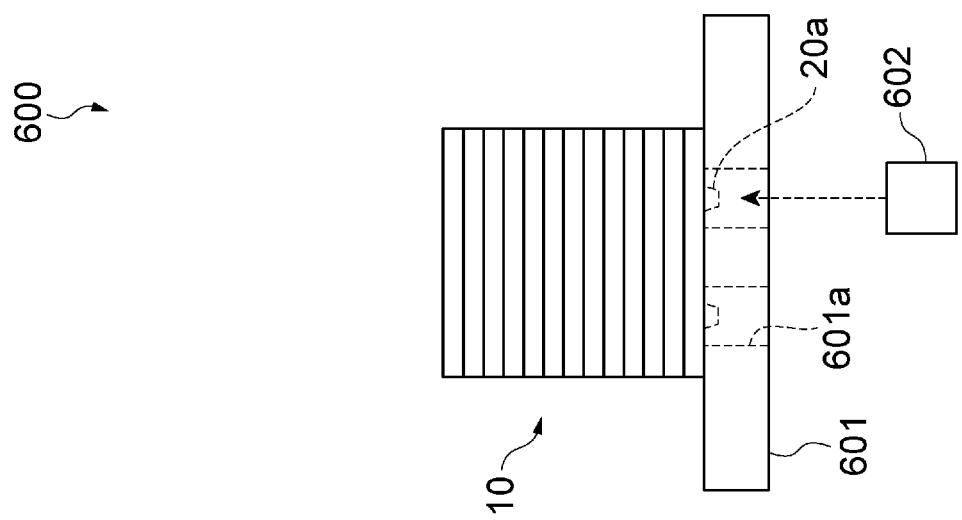
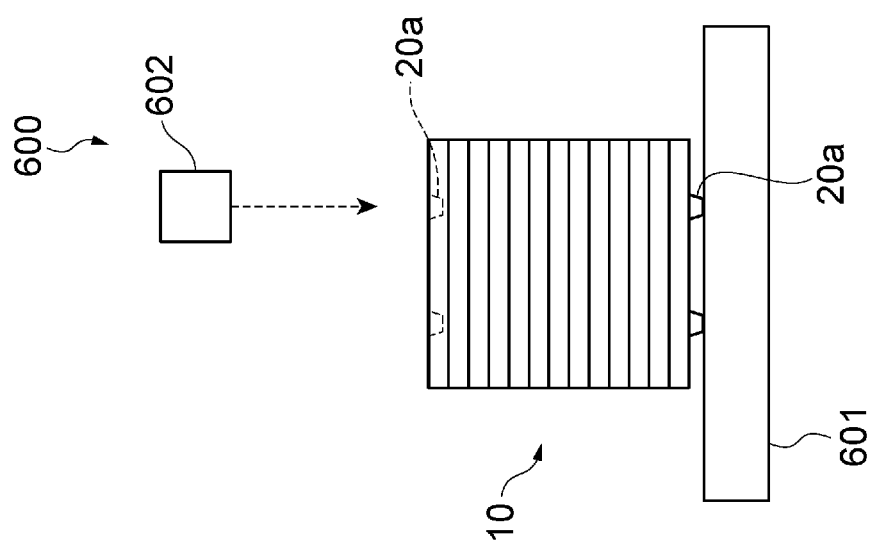
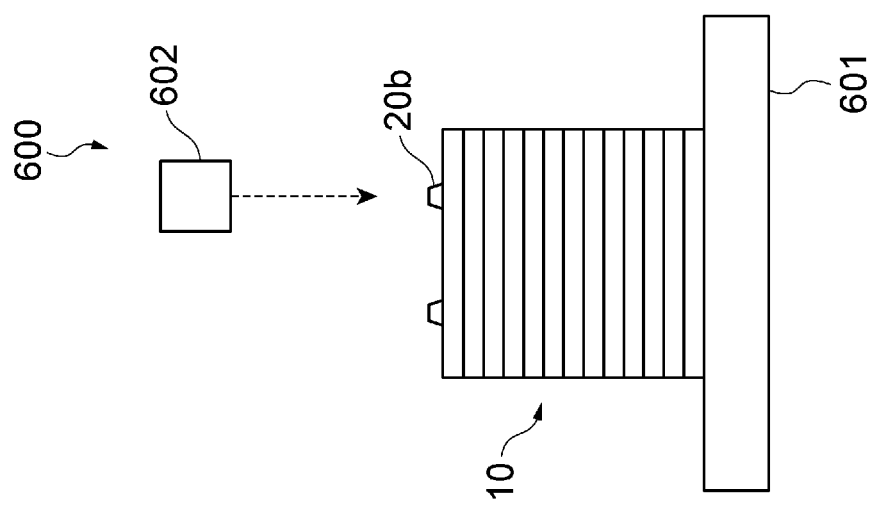

MANUFACTURING METHOD OF LAMINATED IRON CORE

TECHNICAL FIELD

The present disclosure relates to a manufacturing method of a laminated iron core.

BACKGROUND ART

A laminated iron core usually includes a laminate in which a plurality of blanked members obtained by blanking a metal plate (for example, an electromagnetic steel plate) into a predetermined shape are laminated. The plurality of blanked members are interlocked with each other by a caulk (see, for example, Patent Literature 1).

CITATION LIST

Patent Literature

[Patent Literature 1] JP2016-146739A

SUMMARY OF INVENTION

Technical Problem

The caulk includes: a recess formed on a front surface side of the blanked member; and a protrusion formed on a back surface side of the blanked member. The recess of the caulk of one blanked member is fitted with a protrusion of a caulk of another blanked member. Therefore, the protrusion of the caulk formed on the blanked member which forms a lowermost layer of the laminate may protrude further to outside than a lower end surface of the laminate (see FIG. 6 of Patent Literature 1).

In a blanking device of a metal plate, since the metal plate is normally processed by a punch lowered from above, the laminate is discharged from the blanking device in a state where the protrusion of the caulk protrudes downward. However, since a height of the protrusion of the caulk is not constant, the laminate may be in an unstable state. If subsequent processing is performed on the laminate in this state, quality of the processing may be affected.

Particularly in recent years, with the spread of hybrid vehicles (HV) and electric vehicles (EV), there is an increasing demand for a larger electric motor for use in vehicles. With an increase in a size of a laminated iron core, a protrusion amount of the caulk may be set to be larger so as to increase an interlocking force between the plurality of blanked members. In this case, the protrusion of the caulk is more likely to protrude from the lower end surface of the laminate.

Therefore, the present disclosure describes a manufacturing method of a laminated iron core in which subsequent processing can be favorably performed after a laminate is interlocked by a caulk.

Solution to Problem

According to an illustrative aspect of the present disclosure, a manufacturing method of a laminated iron core by laminating a plurality of blanked members to form a laminate, the laminate including a pair of first and second end surfaces and the plurality of blanked members being interlocked by a caulk in a lamination direction of the laminate, includes: forming the laminate such that a protrusion of the caulk protrudes downward from the first end surface being in a downward state; placing the laminate on a support such that the protrusion is not in contact with a support surface of the support; and processing the laminate in a state where the laminate is placed on the support.

Advantageous Effects of Invention

According to the manufacturing method of the laminated iron core of the present disclosure, the subsequent processing can be favorably performed after the laminate is interlocked by the caulk.

BRIEF DESCRIPTION OF DRAWINGS

FIG. 413 is a schematic cross-sectional view for showing a process of forming a caulk.

FIG. 8 is a schematic view partially showing another example of the manufacturing device of the rotor laminated iron core.

FIGS. 9A to 9C are schematic views for showing a state where a protrusion or a recess of the caulk is measured.

DESCRIPTION OF EMBODIMENTS

Figure 1:
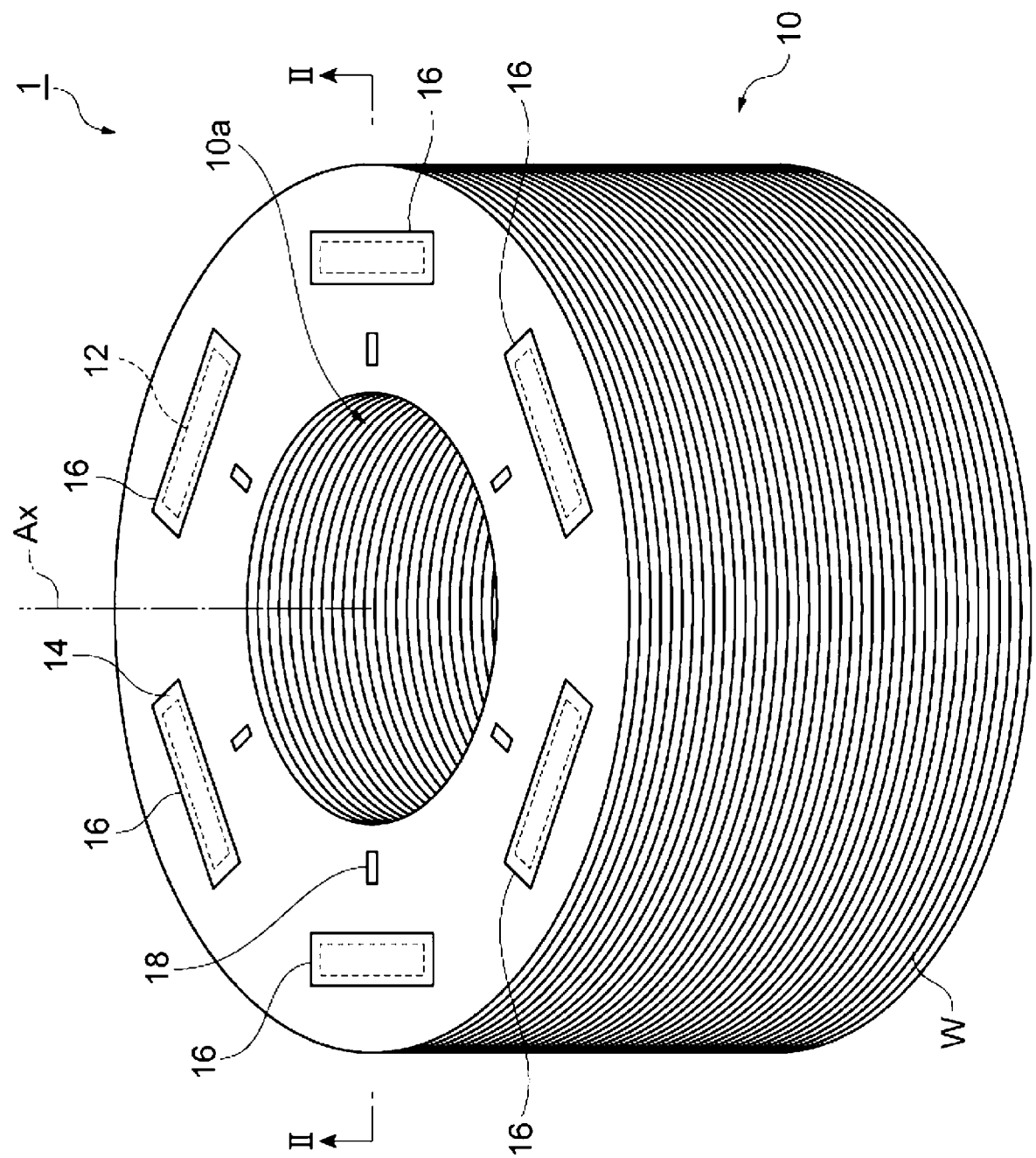
FIG. 1 is a perspective view showing an example of a rotor laminated iron core.

Hereinafter, an example of an embodiment according to the present disclosure will be described in more detail with reference to the drawings. In the following description, the same elements or elements having the same functions will be denoted by the same reference numerals, and repetitive descriptions thereof will be omitted.

Rotor Laminated Iron Core

First, a configuration of a rotor laminated iron core 1 (laminated iron core) will be described with reference to FIGS. 1 and 2. The rotor laminated iron core 1 is a part of a rotor. The rotor is formed by attaching an end face plate (not shown) and a shaft to the rotor laminated iron core 1. The rotor is combined with a stator to form a motor. The rotor laminated iron core 1 in the present embodiment is used in an interior permanent magnet type (IPM) motor.

As shown in FIG. 1, the rotor laminated iron core 1 includes: a laminate 10; a plurality of permanent magnets 12; and a plurality of solidified resins 14.

As shown in FIG. 1, the laminate 10 has a cylindrical shape. An shaft hole 10a penetrating the laminate 10 is provided in a central portion of the laminate 10. The shaft hole 10a extends along a central axis Ax. That is, the shaft hole 10a extends in a lamination direction of the laminate 10 (hereinafter, simply referred to as the "lamination direction"). The lamination direction is also an extending direction of the central axis Ax. In the present embodiment, since the laminate 10 rotates around the central axis Ax, the central axis Ax is also a rotation axis. The shaft is inserted into the shaft hole 10a.

A plurality of magnet-insert holes 16 are formed in the laminate 10. As shown in FIG. 1, the magnet-insert holes 16 are arranged at predetermined intervals along an outer peripheral edge of the laminate 10. As shown in FIG. 2, the magnet-insert holes 16 penetrate the laminate 10 in a manner of extending along the central axis Ax. That is, the magnet-insert holes 16 extend in the lamination direction.

In the present embodiment, shapes of the magnet-insert holes 16 are long holes extending along the outer peripheral edge of the laminate 10. In the present embodiment, the number of the magnet-insert holes 16 is six. The magnet-insert holes 16 are arranged on the same circumference when viewed from above. The positions, shapes, and number of the magnet-insert holes 16 may be changed according to use, required performance, and the like of the motor.

The laminate 10 is configured by laminating a plurality of blanked members W. The blanked members W are plate-like bodies formed by blanking an electromagnetic steel plate ES described below into predetermined shapes, and have shapes corresponding to the laminate 10. As shown in FIG. 2, in the present specification, a blanked member W constituting a portion other than a lowermost layer of the laminate 10 is referred to as "a blanked member W1", and a blanked member W constituting the lowermost layer of the laminate 10 is referred to as "a blanked member W2".

A surface of the blanked member W1 which constitutes an uppermost layer of the laminate 10 constitutes an upper end surface S1 (second end surface) of the laminate 10. A surface of the blanked member W2 which constitutes the lowermost layer of the laminate 10 constitutes a lower end surface S2 (first end surface) of the laminate 10.

The laminate 10 may be configured by so-called rolling lamination. The term "rolling lamination" refers to relatively staggering angles between the blanked members W and laminating a plurality of the blanked members W. The rolling lamination is mainly performed to cancel plate thickness deviation of the blanked members W. The angles of the rolling lamination may be set to any size.

Figure 2:
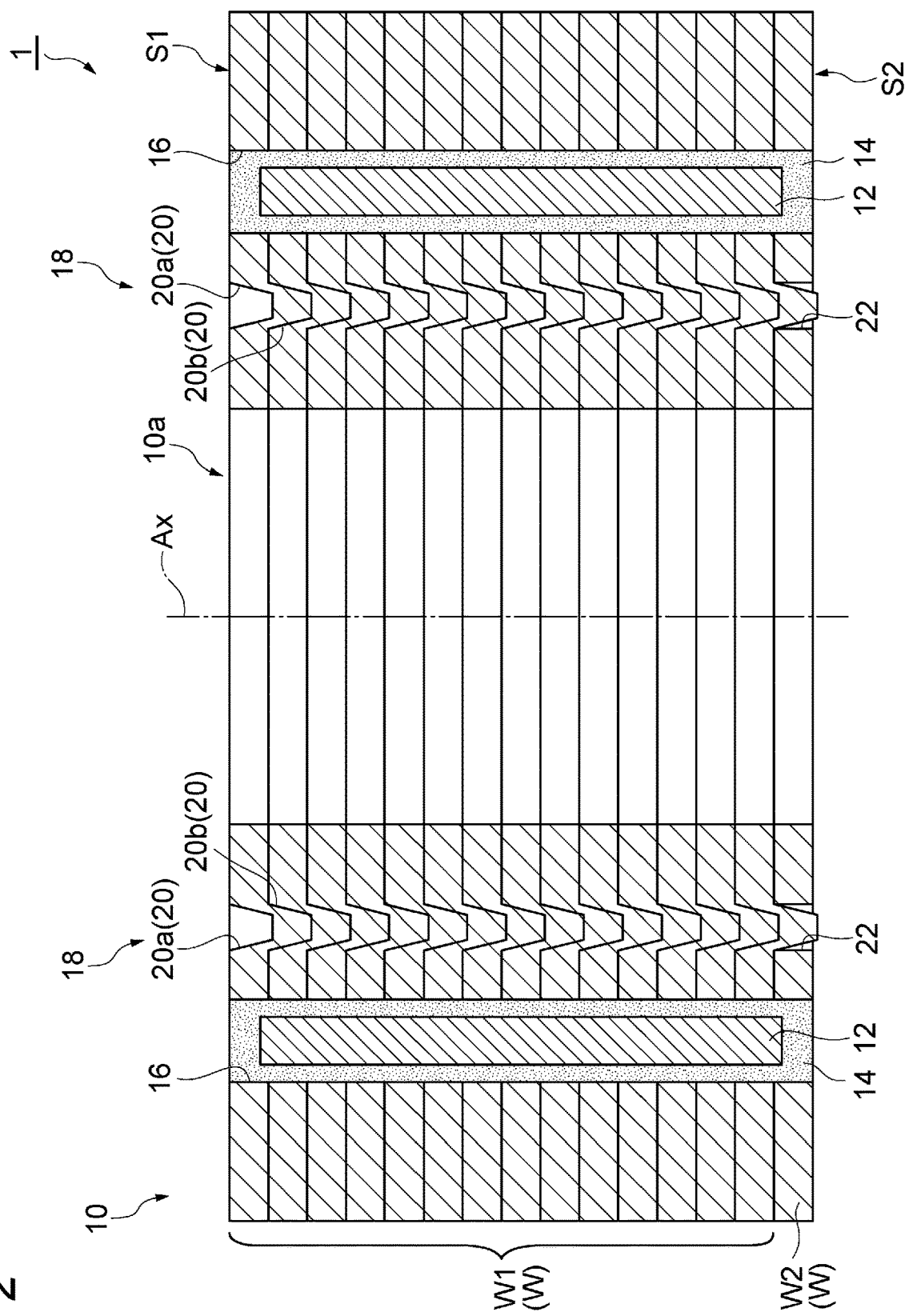
FIG. 2 is a cross-sectional view taken along line II-II of FIG. 1.

As shown in FIGS. 1 and 2, the blanked members W adjacent to each other in the lamination direction are interlocked by a caulk portion 18. Specifically, as shown in FIG. 2, the caulk portion 18 includes a caulk 20 formed on the blanked member W1 and a through hole 22 formed in the blanked member W2.

Each caulk 20 includes: a recess 20a formed on a front surface side of the blanked member W1; and a protrusion 20b formed on a back surface side of the blanked member W1. The caulk portion 20 has a mountain shape as a whole, for example. The caulk 20 having such a shape is also referred to as the "V-shaped caulk".

The recess 20a of one blanked member W1 is fitted to the protrusion 20b of a blanked member W1 adjacent to the front surface side of the one blanked member W1. The protrusion 20b of the one blanked member W1 is joined to the recess 20a of a blanked member W1 adjacent to the back surface side of the one blanked member W1.

The through hole 22 is a long hole having a shape corresponding to an outer shape of the caulk 20. When the caulk 20 is the V-shaped caulk, the through hole 22 has a rectangular shape. The protrusion 20b of the blanked member W1 adjacent to the blanked member W2 is fitted into the through hole 22. When the laminate 10 is continuously manufactured, the through hole 22 has a function of preventing the blanked member W formed later from being interlocked with the laminate 10 manufactured earlier due to the caulk 20 (the protrusion 20b).

As shown in FIG. 2, a tip end portion of the protrusion 20b of the caulk 20 protrudes outward from the through hole 22. That is, in a state where the lower end surface S2 of the laminate 10 faces downward, a tip end portion of the protrusion 20b of the caulk 20 protrudes downward from the lower end surface S2.

As shown in FIGS. 1 and 2, one permanent magnet 12 is inserted into each magnet-insert hole 16. A shape of the permanent magnet 12 is not particularly limited, and the permanent magnet 12 has a rectangular parallelepiped shape in the present embodiment. A type of the permanent magnet 12 may be determined according to the use, the required performance, and the like of the motor, and may be, for example, a sintered magnet or a bonded magnet.

The solidified resin 14 is obtained by solidifying a molten resin material (molten resin) filled in the magnet-insert hole 16. The filling of the molten resin is performed, for example, after the permanent magnet 12 is inserted into the magnet-insert hole 16. The solidified resin 14 has a function of fixing the permanent magnet 12 in the magnet-insert hole 16 and a function of joining the adjacent blanked members W in the lamination direction (up-down direction). Examples of the resin material constituting the solidified resin 14 include a thermo setting resin, a thermoplastic resin, or the like. A specific example of the thermo setting resin includes a resin composition including an epoxy resin, a curing initiator, and an additive. Examples of the additive include a filler, a flame retardant, a stress reducing agent, or the like.

Manufacturing Device of Rotor Laminated Iron Core

Next, a manufacturing device 100 of the rotor laminated iron core 1 will be described with reference to FIGS. 3 to 6.

Figure 3:
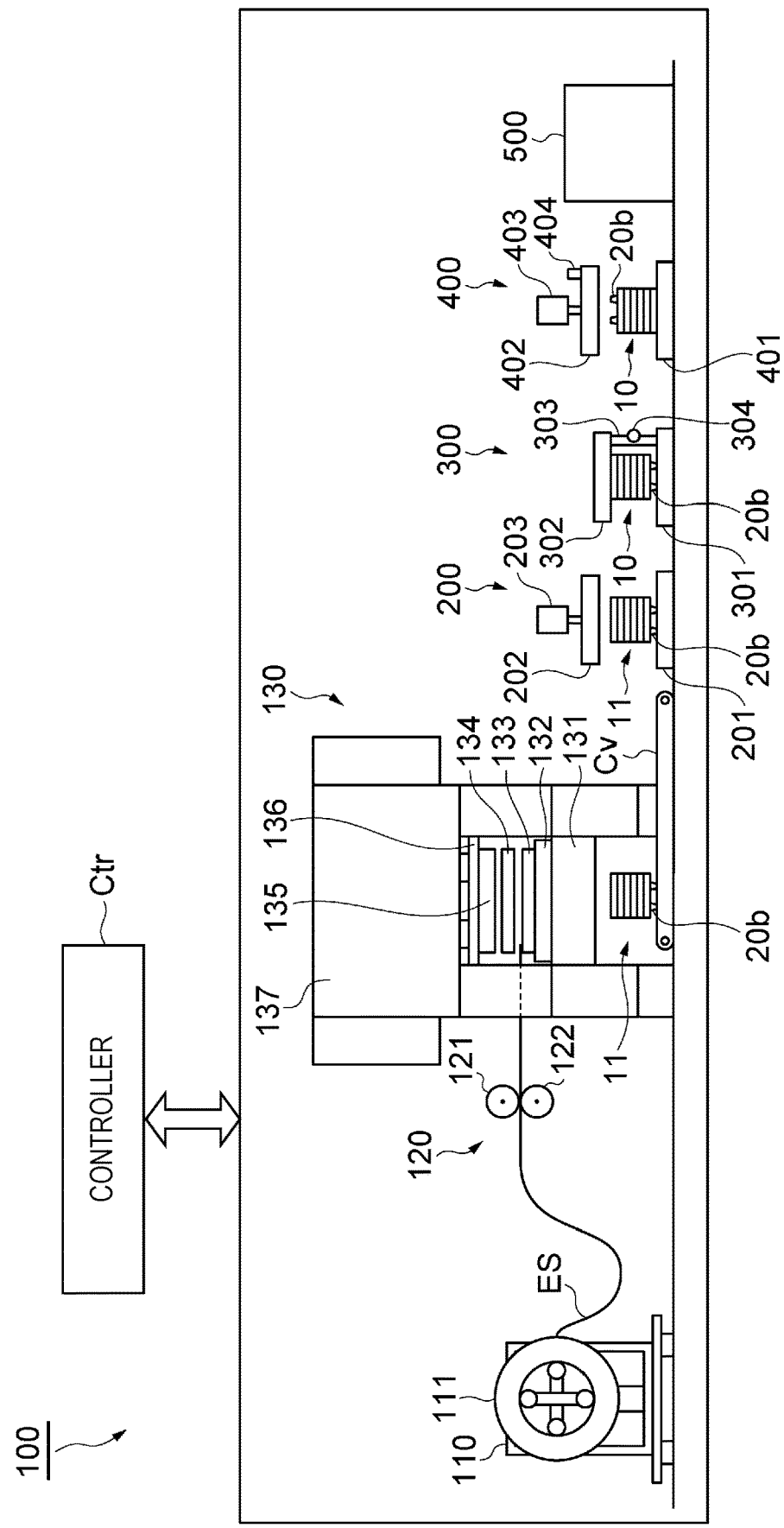
FIG. 3 is a schematic view showing an example of a manufacturing device of the rotor laminated iron core.

As shown in FIG. 3, the manufacturing device 100 is a device for manufacturing the rotor laminated iron core 1 from an electromagnetic steel plate ES (a plate to be processed) which is a strip-like metal plate. The manufacturing device 100 includes an uncoiler 110, a feeding device 120, a blanking device 130, a pressing device 200, an inverting device 300, a lamination thickness measuring device 400, a magnet attachment device 500, and a controller Ctr (control unit).

The uncoiler 110 rotatably holds a coil material 111 in a state where the coil material 111 is mounted. The coil material 111 is obtained by winding the strip-shaped electromagnetic steel plate ES into a coil shape. The feeding device 120 includes a pair of rollers 121, 122 sandwiching the electromagnetic steel plate ES from an upper side and a lower side. The pair of rollers 121, 122 rotate and stop based on an instruction signal from the controller Ctr, and intermittently and sequentially feed the electromagnetic steel plate ES toward the blanking device 130.

The blanking device 130 operates based on the instruction signal from the controller Ctr. The blanking device 130 has a function of sequentially blanking, by a plurality of punches, the electromagnetic steel plate ES intermittently fed by the feeding device 120 to form the blanked members W, and a function of sequentially laminating the blanked members W obtained by the blanking so as to manufacture the temporary laminate 11. In the present specification, the temporary laminate 11 is in a state where the plurality of blanked members W are laminated and interlocked to each other by the caulk portion 18 in the same manner as the laminate 10. However, the blanked members W are not in close contact with each other, and a certain degree of gap is present between the blanked members W.

As shown in FIG. 3, the blanking device 130 includes a base 131, a lower die 132, a die plate 133, a stripper 134, an upper die 135, a top plate 136, a pressing machine 137 (a drive unit), and a plurality of punches.

The base 131 is installed on a floor surface, and supports the lower die 132 placed on the base 131. The lower die 132 holds the die plate 133 placed on the lower die 132. The lower die 132 is provided with a discharge hole at a predetermined position through which a material (for example, the blanked members W and waste materials) blanked from the electromagnetic steel plate ES is discharged.

The die plate 133 has a function of forming the blanked member W together with the plurality of punches. The die plate 133 is provided with dies at positions corresponding to each punch. Each die is provided with a die hole through which a corresponding punch can be inserted.

The stripper 134 has a function of sandwiching the electromagnetic steel plate ES with the die plate 133 when the electromagnetic steel plate ES is blanked by each punch, and a function of removing the electromagnetic steel plate ES clamped by each punch from each punch. The upper die 135 is located above the stripper 134. A base end portion of each punch is fixed to the upper die 135. Therefore, the upper die 135 holds each punch.

The top plate 136 holds the upper die 135 from an upper side of the upper die 135. The pressing machine 137 is located above the top plate 136. A piston of the pressing machine 137 is connected to the top plate 136 and operates based on the instruction signal from the controller Ctr. When the pressing machine 137 operates, the piston expands and contracts, and the stripper 134, the upper die 135, the top plate 136, and each punch move up and down as a whole.

Figure 4A:
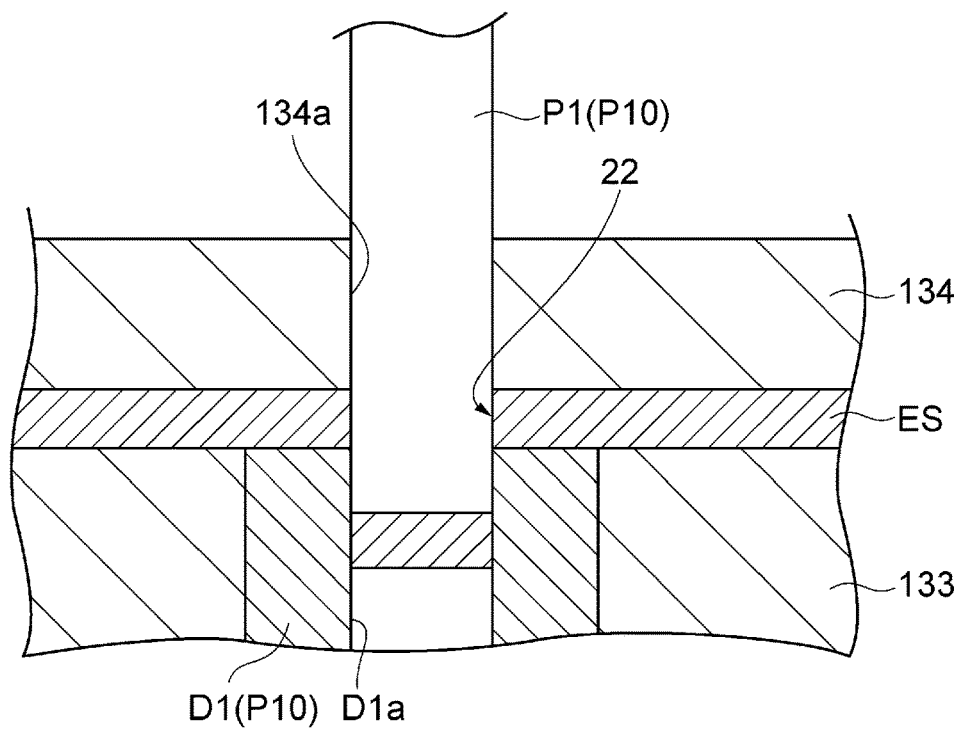
FIG. 4A is a schematic cross-sectional view for showing a process of forming a through hole.
Figure 4B:
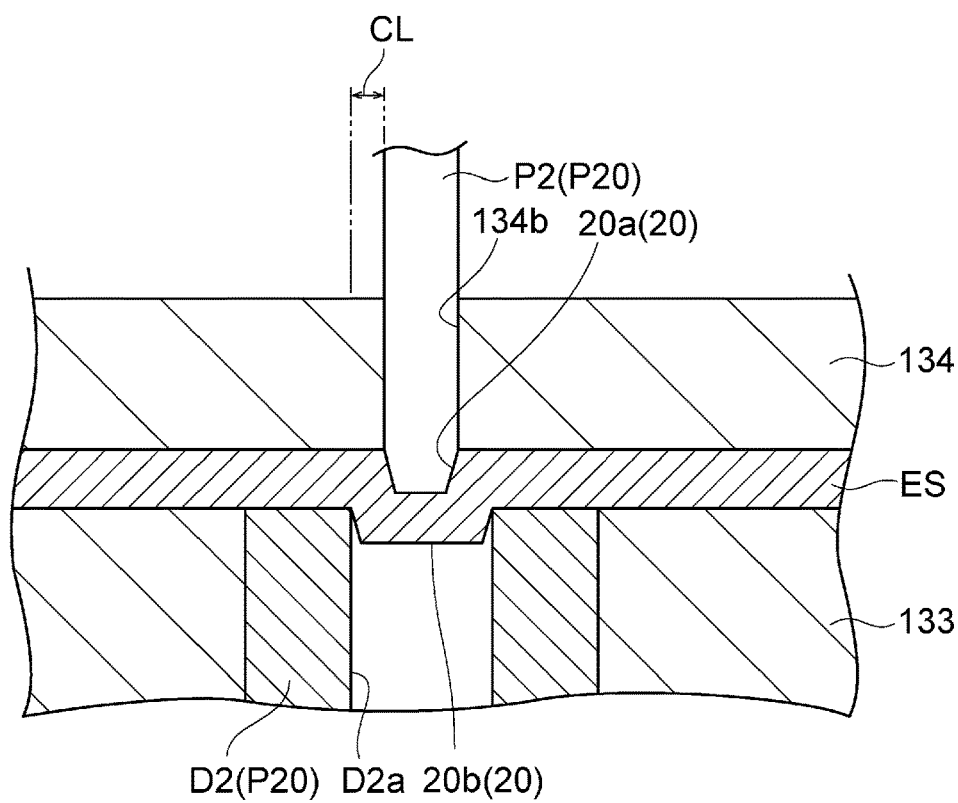
Figure 5:
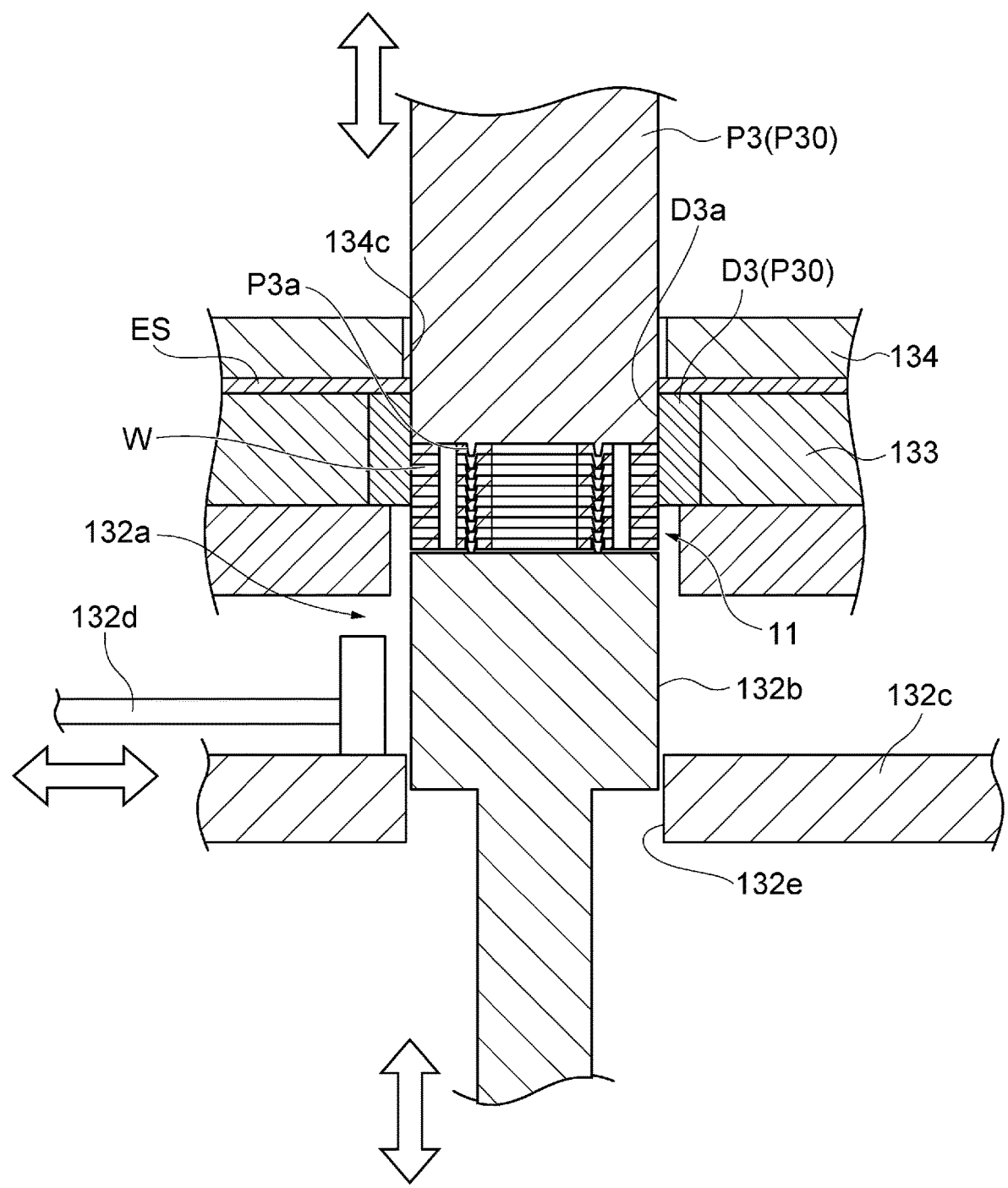
FIG. 5 is a cross-sectional view schematically showing a mechanism for laminating a blanked member and a mechanism for discharging a laminate from a die, and for showing a state where the blanked member is blanked from an electromagnetic steel plate by a punch.

Here, the plurality of punches and the plurality of dies included in the blanking device 130 will be described in detail. For example, as shown in FIGS. 4 and 5, the blanking device 130 includes punch portions P10, P20, P30.

The punch portion P10 has a function of forming the through hole 22 in the electromagnetic steel plate ES serving as the blanked member W2. As shown in FIG. 4A, the punch portion P10 is configured by a combination of a die D1 and a punch P1. A die hole D1a is formed in the die D1.

The punch P1 has a shape corresponding to the die hole D1a. The punch P1 can be inserted into and removed from the die hole D1a through a through hole 134a of the stripper 134.

The punch portion P20 has a function of forming the caulk 20 on the electromagnetic steel plate ES serving as the blanked member W1. As shown in FIG. 4B, the punch portion P20 is configured by a combination of a die D2 and a punch P2. A die hole D2a is formed in the die D2. A size of the die hole D2a, may be the same as a size of the die hole D1a.

The punch P2 has a shape corresponding to the die hole D2a. The punch P2 can be inserted into and removed from the die hole D2a through a through hole 134b of the stripper 134. An outer shape of the punch P2 is set to be slightly smaller than an outer shape of the die hole D2a. A clearance CL between the die hole D2a and the punch P2 can be set to various sizes according to a fitting force generated between the caulk 20 and the through hole 22.

A tip end portion of the punch P2 has a mountain shape as a whole. Therefore, shape unevenness corresponding to the tip end portion of the punch P2 is formed on the electromagnetic steel plate ES processed by the punch P2.

The punch portion P30 has a function of blanking the electromagnetic steel plate ES to form the blanked member W. As shown in FIG. 5, the punch portion P30 is configured by a combination of a die D3 and a punch P3. A die hole D3a is formed in the die D3. The die hole D3a has a shape corresponding to an outer shape of the blanked member W.

The punch P3 has a shape corresponding to the die hole D3a. The punch P3 can be inserted into and removed from the die hole D3a through a through hole 134c of the stripper 134. A plurality of pressing protrusions P3a are provided on a tip end surface of the punch P3. The pressing protrusions P3a protrude downward from the tip end surface. Each of the plurality of pressing protrusions P3a is located to correspond to the plurality of caulks 20 formed on the electromagnetic steel plate ES by the punch P2.

A cylinder 132b, a stage 132c, and a pusher 132d are arranged in a space 132a below the die D3. The cylinder 132b is movable in the up-down direction through a hole 132e provided in the stage 132c based on the instruction signal from the controller Ctr. Specifically, the cylinder 132b intermittently moves downward each time when the blanked member W is laminated on the cylinder 132b. When a predetermined number of blanked members W are laminated on the cylinder 132b, the temporary laminate 11 is formed, and the cylinder 132b moves to a position where a front surface of the cylinder 132b is flush with a front surface of the stage 132c.

The pusher 132d is movable in a horizontal direction on the front surface of the stage 132c based on the instruction signal from the controller Ctr. When the cylinder 132b is moved to the position where the front surface of the cylinder 132b is flush with the front surface of the stage 132c, the pusher 132d delivers the temporary laminate 11 from the cylinder 132b to the stage 132c. At this time, the temporary laminate 11 is in a state where the lower end surface S2 faces downward and the protrusion 20b protrudes downward from the lower end surface S2 (upright state). The temporary laminate 11 delivered to the stage 132c is conveyed to the subsequent pressing device 200 by a conveyor Cv. The temporary laminate 11 may be manually conveyed in a state of being placed in a container.

Referring back to FIG. 3, the pressing device 200 operates based on the instruction signal from the controller Ctr. The pressing device 200 has a function of applying a predetermined load L1 (first load) from the lamination direction to the temporary laminate 11 to form the laminate 10 in which the gap between the blanked members W is smaller than that of the temporary laminate 11.

The load L1 applied to the temporary laminate 11 may have various sizes depending on a size of the laminate 10, and may be, for example, about 0.1 ton to 50 tons, about 0.5 ton to 30 tons, or about 1 ton to 10 tons. When the load L1 is equal to or greater than 0.1 ton, spring back tends to be less likely to occur. On the other hand, when a load which is greater than necessary is applied to the temporary laminate 11, the formed laminate 10 may be deformed. When the load L1 is equal to or less than 50 tons, such deformation of the laminate 10 tends to be less likely to occur.

The pressing device 200 includes a pair of clamping members 201, 202 and a lifting mechanism 203. The pair of clamping members 201, 202 are flat plates having a rectangular shape. The pair of clamping members 201, 202 are arranged in the up-down direction. A plurality of guide shafts (not shown) extending upward may be provided on an upper surface of the clamping member 201 located on a lower side. Each guide shaft is located at each corner portion of the clamping member 201. A through hole (not shown) through which the corresponding guide shaft can be inserted may be provided in each corner portion of the clamping member 202 located on an upper side.

The lifting mechanism 203 is connected to the clamping member 202. The lifting mechanism 203 operates based on the instruction signal from the controller Ctr, and reciprocates the clamping member 202 in the up-down direction. That is, the lifting mechanism 203 is configured such that the clamping members 201, 202 can be brought close to and separated from each other by moving the clamping member 202 up and down along the guide shafts. The lifting mechanism 203 is not particularly limited as long as the clamping member 202 is moved up and down, and may be, for example, an actuator, an air cylinder, or the like.

In the present embodiment, the temporary laminate 11 in the upright state is clamped by the clamping members 201, 202. That is, the lower end surface S2 of the temporary laminate 11 faces the clamping member 201. The protrusion 20b protruding from the lower end surface S2 of the temporary laminate 11 is abutted against the upper surface of the clamping member 201. The upper end surface S1 of the temporary laminate 11 faces and abuts against the clamping member 202.

The inverting device 300 operates based on the instruction signal from the controller Ctr. The inverting device 300 has a function of inverting a posture of the laminate 10 conveyed in the upright state from the pressing device 200.

The inverting device 300 includes a pair of clamping members 301, 302, a lifting mechanism 303, and an inverting mechanism 304. The pair of clamping members 301, 302 are flat plates having a rectangular shape. The pair of clamping members 301, 302 are arranged in the up-down direction.

The lifting mechanism 303 is connected to the clamping members 301, 302, The lifting mechanism 303 operates based on the instruction signal from the controller Ctr, and reciprocates the clamping member 302 in the up-down direction. That is, the lifting mechanism 303 is configured such that the clamping members 301, 302 can be brought close to and separated from each other by moving the clamping member 302 up and down. The lifting mechanism 303 is not particularly limited as long as the clamping member 302 is moved up and down, and may be, for example, an actuator, an air cylinder, or the like.

The inverting mechanism 304 operates based on the instruction signal from the controller Ctr, and rotates the clamping members 301, 302 and the lifting mechanism 303 as a whole by 180° around an axis extending along a horizontal plane. That is, in a case where the laminate 10 is clamped in the upright state by the clamping members 301, 302, the inverting mechanism 304 rotates the clamping members 301, 302 and the lifting mechanism 303 by 180°, so that the laminate 10 is in a state where the lower end surface S2 faces upward and the protrusion 20b protrudes upward from the lower end surface S2 (inverted state).

The lamination thickness measuring device 400 operates based on the instruction signal from the controller Ctr. The lamination thickness measuring device 400 has a function of measuring a lamination thickness of the laminate 10 (height of the laminate 10 in the lamination direction). The lamination thickness measuring device 400 measures the lamination thickness of the laminate 10 in a state where a predetermined load L2 is applied to the laminate 10 from the lamination direction.

The load L2 applied to the laminate 10 is set to be equal to or less than the load L1. The load L2 may have various sizes depending on the size of the laminate 10, and may be set such that, for example, a thickness T of the pressed laminate 10 is equal to 99.9% or more of a thickness T0 of the laminate 10 before pressing and is less than the thickness T0 ($0.999 T_0 \leq T < T_0$).

The lamination thickness measuring device 400 includes a pair of clamping members 401, 402, a lifting mechanism 403, and a distance sensor 404. The pair of clamping members 401, 402 are flat plates having a rectangular shape. The pair of clamping members 401, 402 are arranged in the up-down direction. A plurality of guide shafts (not shown) extending upward may be provided on an upper surface of the clamping member 401 (support) located on a lower side. Each guide shaft is located at each corner portion of the clamping member 401. A through hole (not shown) through which the corresponding guide shaft can be inserted may be provided in each corner portion of the clamping member 402 located on an upper side.

The lifting mechanism 403 is connected to the clamping member 402. The lifting mechanism 403 operates based on the instruction signal from the controller Ctr, and reciprocates the clamping member 402 in the up-down direction. That is, the lifting mechanism 403 is configured such that the clamping members 401, 402 can be brought close to and separated from each other by moving the clamping member 402 up and down. The lifting mechanism 403 is not particularly limited as long as the clamping member 402 is moved up and down, and may be, for example, an actuator, an air cylinder, or the like.

In the present embodiment, the laminate 10 in the inverted state is clamped by the clamping members 401, 402. That is, the upper end surface S1 of the laminate 10 faces and abuts against an upper surface of the clamping member 401. Therefore, the upper surface of the clamping member 401 functions as a support surface that supports the laminate 10. The lower end surface S2 of the laminate 10 faces a lower surface of the clamping member 402. The protrusion 20b protruding from the lower end surface S2 of the laminate 10 is abutted against the lower surface of the clamping member 402.

The distance sensor 404 is provided, for example, on the clamping member 402. The distance sensor 404 is configured to measure a distance between the clamping member 401 and the clamping member 402 in a state where the clamping members 401, 402 clamp the laminate 10. That is, the distance sensor 404 indirectly measures the lamination thickness of the laminate 10. Data of the lamination thickness of the laminate 10 measured by the distance sensor 404 is transmitted to the controller Ctr.

The magnet attachment device 500 operates based on the instruction signal from the controller Ctr. The magnet attachment device 500 has a function of inserting the permanent magnet 12 into each magnet-insert hole 16, and a function of filling the molten resin into the magnet-insert hole 16 through which the permanent magnet 12 is inserted. The magnet attachment device 500 includes a lower die 510 (support), an upper die 520, and a plurality of plungers 530, as shown in detail in FIG. 6.

The lower die 510 includes a base member 511 and an insertion post 512 provided on the base member 511. The base member 511 is a plate-shaped member having a rectangular shape. The base member 511 is configured such that the laminate 10 can be placed thereon. The insertion post 512 is located substantially at a central portion of the base member 511, and protrudes upward from an upper surface of the base member 511. The insertion post 512 has a cylindrical shape and has an outer shape corresponding to the shaft hole 10a of the laminate 10.

The upper die 520 is configured to be capable of clamping the laminate 10 in the lamination direction (height direction of the laminate 10) together with the lower die 510. When the upper die 520 and the lower die 510 clamp the laminate 10 together, a predetermined load L3 (second load) is applied to the laminate 10 from the lamination direction. The load. L3 applied to the laminate 10 is set to be equal to or less than the load L1. The load L3 may have various sizes depending on the size of the laminate 10, and may be, for example, about 0.1 ton to 10 tons.

The upper die 520 includes a base member 521 and a built-in heat source 522. The base member 521 is a plate-shaped member having a rectangular shape. The base member 521 includes one through hole 521a, a plurality of accommodation holes 521b, and a plurality of recessed portions 521c. The through hole 521a is located substantially in a central portion of the base member 521. The through hole 521a has a shape corresponding to the insertion post 512 (substantially circular shape), and the insertion post 512 can be inserted therethrough.

The plurality of accommodation holes 521b penetrate the base member 521 and are arranged at predetermined intervals along a periphery of the through hole 521a. Each accommodation hole 521b is located at a position corresponding to each magnet-insert hole 16 of the laminate 10 when the lower die 510 and the upper die 520 clamp the laminate 10. Each accommodation hole 521b has a cylindrical shape and has a function of accommodating at least one resin pellet P therein. Each of the plurality of recessed portions 521c is capable of accommodating the protrusion 20b protruding from the lower end surface S2 of the laminate 10.

In the present embodiment, the laminate 10 in the inverted state is clamped by the lower die 510 (the base member 511) and the upper die 520 (the base member 521). That is, the upper end surface S1 of the laminate 10 faces and abuts against an upper surface of the base member 511. Therefore, the upper surface of the base member 511 functions as a support surface that supports the laminate 10. The lower end surface S2 of the laminate 10 faces and abuts against a lower surface of the base member 521. The protrusion 20b protruding upward from the lower end surface S2 of the laminate 10 is accommodated in the corresponding recessed portion 521c.

The built-in heat source 522 is, for example, a heater built in the base member 521. When the built-in heat source 522 operates, the base member 521 is heated, the laminate 10 which is in contact with the base member 521 is heated, and the resin pellets P accommodated in the accommodation holes 521b are heated. As a result, the resin pellets P are melted and changed into molten resin.

The plurality of plungers 530 are located above the upper die 520. Each plunger 530 is configured to be able to be inserted into and removed from the corresponding accommodation hole 521b by a driving source (not shown).

The controller Ctr generates the instruction signal for operating the feeding device 120, the blanking device 130, the pressing device 200, the inverting device 300, the lamination thickness measuring device 400 and the magnet attachment device 500 based on, for example, a program recorded in a recording medium (not shown) or operation input from an operator, and transmits the instruction signal to such devices, respectively.

The controller Ctr has a function of determining whether the data of the lamination thickness measured by the lamination thickness measuring device 400 is within a standard. The laminate 10 whose lamination thickness is within the standard is determined as a non-defective product by the controller Ctr, and is conveyed to the magnet attachment device 500. On the other hand, the laminate 10 whose lamination thickness is outside the standard is determined as a defective product by the controller Ctr, and is excluded from a manufacturing line.

Manufacturing Method of Rotor Laminated Iron Core

Next, a method of manufacturing the rotor laminated iron core 1 will be described with reference to FIGS. 3 to 7.

Figure 7:
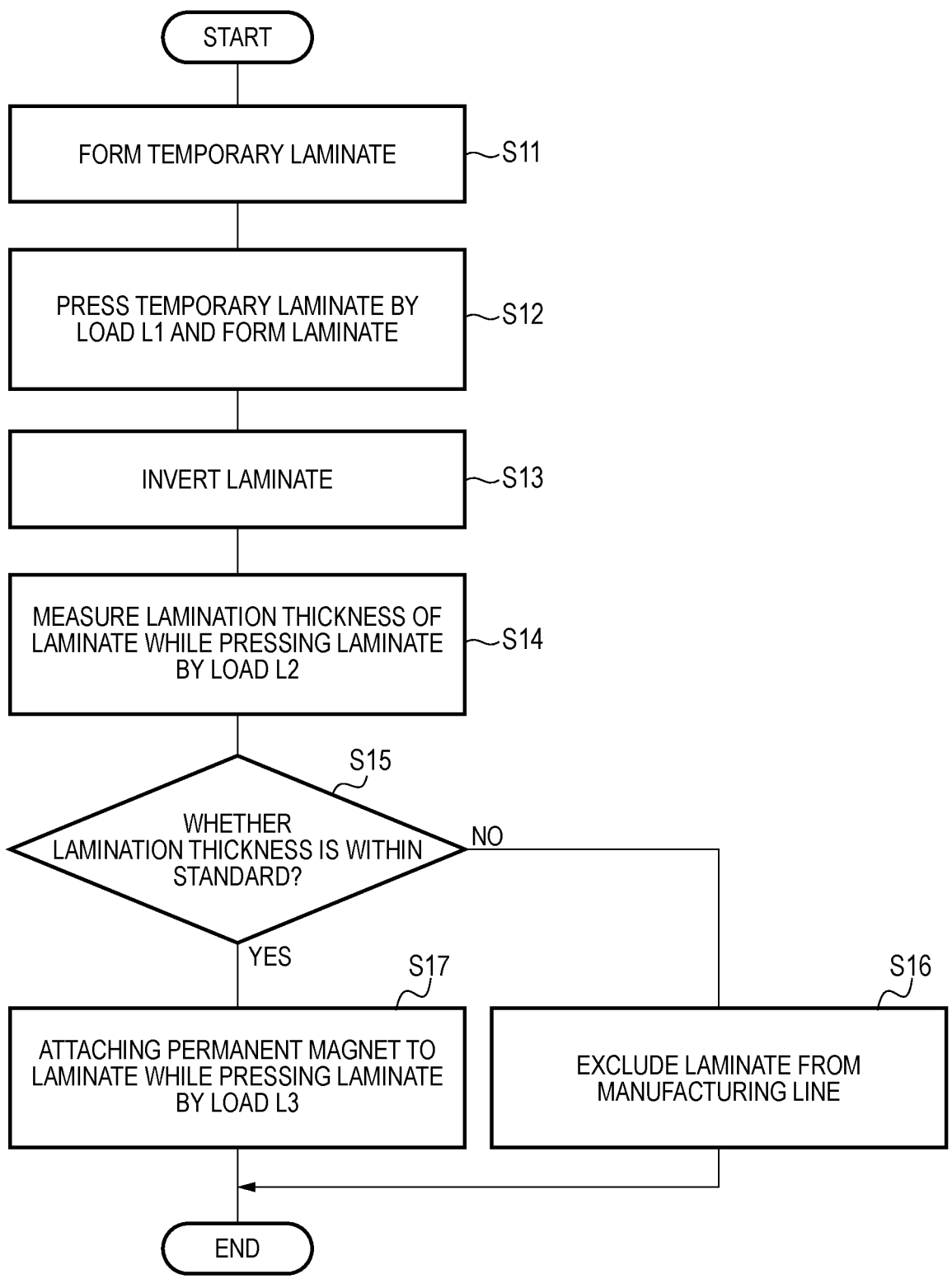
FIG. 7 is a flowchart for showing an example of a manufacturing method of the rotor laminated iron core.

First, the electromagnetic steel plate ES is sequentially blanked by the blanking device 130, the obtained blanked members W are laminated to form the temporary laminate 11 (see step S11 in FIG. 7). Specifically, as shown in FIG. 4, the electromagnetic steel plate ES is fed to the blanking device 130 by the feeding device 120, a processing target portion of the electromagnetic steel plate ES reaches a predetermined punch, a through hole is formed in accordance with the shaft hole 10a (so-called inner-shape blanking), through holes are formed in accordance with each magnet-insert hole 16, the caulk 20 or the through hole 22 is formed, and the blanked member W is blanked (so-called outer-shape blanking) from the electromagnetic steel plate ES.

The caulk 20 and the through hole 22 are selectively formed. That is, the caulk 20 is formed in a predetermined region where the blanked member W1 is to be formed on the electromagnetic steel plate ES, and the through hole 22 is formed in a predetermined region where the blanked member W2 is to be formed on the electromagnetic steel plate ES.

The through hole 22 is formed as follows. That is, as shown in FIG. 4A, the blanking device 130 operates based on the instruction signal from the controller Ctr, the electromagnetic steel plate ES is clamped by the die plate 133 and the stripper 134. Subsequently, the punch P1 moves down through the through hole 134a of the stripper 134, and a tip end portion of the punch P1 pushes the electromagnetic steel plate ES into the die hole D1a. As a result, the through hole 22 is formed in the electromagnetic steel plate ES.

The caulk 20 is formed as follows. That is, as shown in FIG. 4B, the blanking device 130 operates based on the instruction signal from the controller Ctr, the electromagnetic steel plate ES is clamped by the die plate 133 and the stripper 134. Subsequently, the punch P2 moves down through the through hole 134b of the stripper 134, and the tip end portion of the punch P2 pushes the electromagnetic steel plate ES into the die hole D2a. As a result, the caulk 20 is formed on the electromagnetic steel plate ES.

The blanking of the blanked member W blanked from the electromagnetic steel plate ES is performed as follows. That is, as shown in FIG. 5, the blanking device 130 operates based on the instruction signal from the controller Ctr, the electromagnetic steel plate ES is clamped by the die plate 133 and the stripper 134. Subsequently, the punch P3 moves down through the through hole 134c of the stripper 134, and the tip end portion of the punch P3 pushes the electromagnetic steel plate ES into the die hole D3a. As a result, the blanked member W is blanked from the electromagnetic steel plate ES.

When the blanked member W2 is blanked from the electromagnetic steel plate ES by the punch P3, since the pressing protrusion P3a is inserted into the through hole 22, the electromagnetic steel plate ES is not processed by the pressing protrusion P3a. Meanwhile, when the blanked member W1 is blanked from the electromagnetic steel plate ES by the punch P3, the pressing protrusion P3a presses the recess 20a of the corresponding caulk 20. As a result, the protrusion 20b of the caulk 20 is pressed into the recess 20a of the caulk 20 or the through hole 22, and such two members are fitted to each other.

The blanked members W blanked from the electromagnetic steel plate ES by the punch P3 are laminated on the cylinder 132b to form the temporary laminate 11 in the upright state. The temporary laminate 11 in the upright state is delivered from the cylinder 132b to the stage 132c by the pusher 132d, and is further conveyed to the pressing device 200 by the conveyor Cv.

Next, the temporary laminate 11 conveyed to the pressing device 200 is placed on the clamping member 201 in the upright state. At this time, the lower end surface S2 of the laminate 10 abuts against the clamping member 201. Next, the controller Ctr instructs the lifting mechanism 203 to lower the clamping member 202. As a result, the temporary laminate 11 is clamped between the clamping members 201, 202, and the temporary laminate 11 is pressed with the load L1. As a result, the gap between the blanked members W is reduced, and the laminate 10 is formed (see step S12 in FIG. 7). The laminate 10 is conveyed to the inverting device 300 in the upright state.

Next, the laminate 10 conveyed to the inverting device 300 is placed on the clamping member 301 in the upright state. Next, the controller Ctr instructs the lifting mechanism 303 to lower the clamping member 302. As a result, the laminate 10 is clamped between the clamping members 301, 302. In this state, the controller Ctr rotates the clamping members 301, 302 and the lifting mechanism 303 as a whole by 180° together with the laminate 10 which is supported by the inverting mechanism 304 and is clamped by the clamping members 301, 302. As a result, the laminate 10 is inverted and is in the inverted state (see step S13 in FIG. 7). The laminate 10 is conveyed to the lamination thickness measuring device 400 in the inverted state.

Next, the laminate 10 conveyed to the lamination thickness measuring device 400 is placed on the clamping member 401 in the inverted state. At this time, the upper end surface S1 of the laminate 10 abuts against the clamping member 401. Next, the controller Ctr instructs the lifting mechanism 403 to lower the clamping member 402. As a result, the laminate 10 is clamped between the clamping members 401, 402, and the laminate 10 is pressed with the load L2. In this state, the controller Ctr instructs the distance sensor 404 to measure the distance between the clamping members 401, 402. The distance sensor 404 transmits the measured data to the controller Ctr as the data of the lamination thickness of the laminate 10. As a result, the lamination thickness of the laminate 10 is measured (see step S14 in FIG. 7). The thickness T0 of the laminate 10 before being pressed with the load L2 can be measured by various known methods, and can be measured through using, for example, a distance sensor using ultrasonic waves or the like, a scale, or the like.

Next, the controller Ctr determines whether the data of the lamination thickness transmitted from the distance sensor 404 is within the predetermined standard (see step S15 of FIG. 7). When the controller Ctr determines that the lamination thickness of the laminate 10 is outside the predetermined standard (NO in step S15 of FIG. 7), the laminate 10 is highly likely to be a defective product, so that the laminate 10 is excluded from the manufacturing line (see step S16 of FIG. 7), When the lamination thickness of the laminate 10 is greater than the predetermined standard, at least one blanked member W may be removed from the laminate 10 such that the lamination thickness of the laminate 10 is within the predetermined standard, and the laminate 10 may be returned to the manufacturing line.

Figure 6:
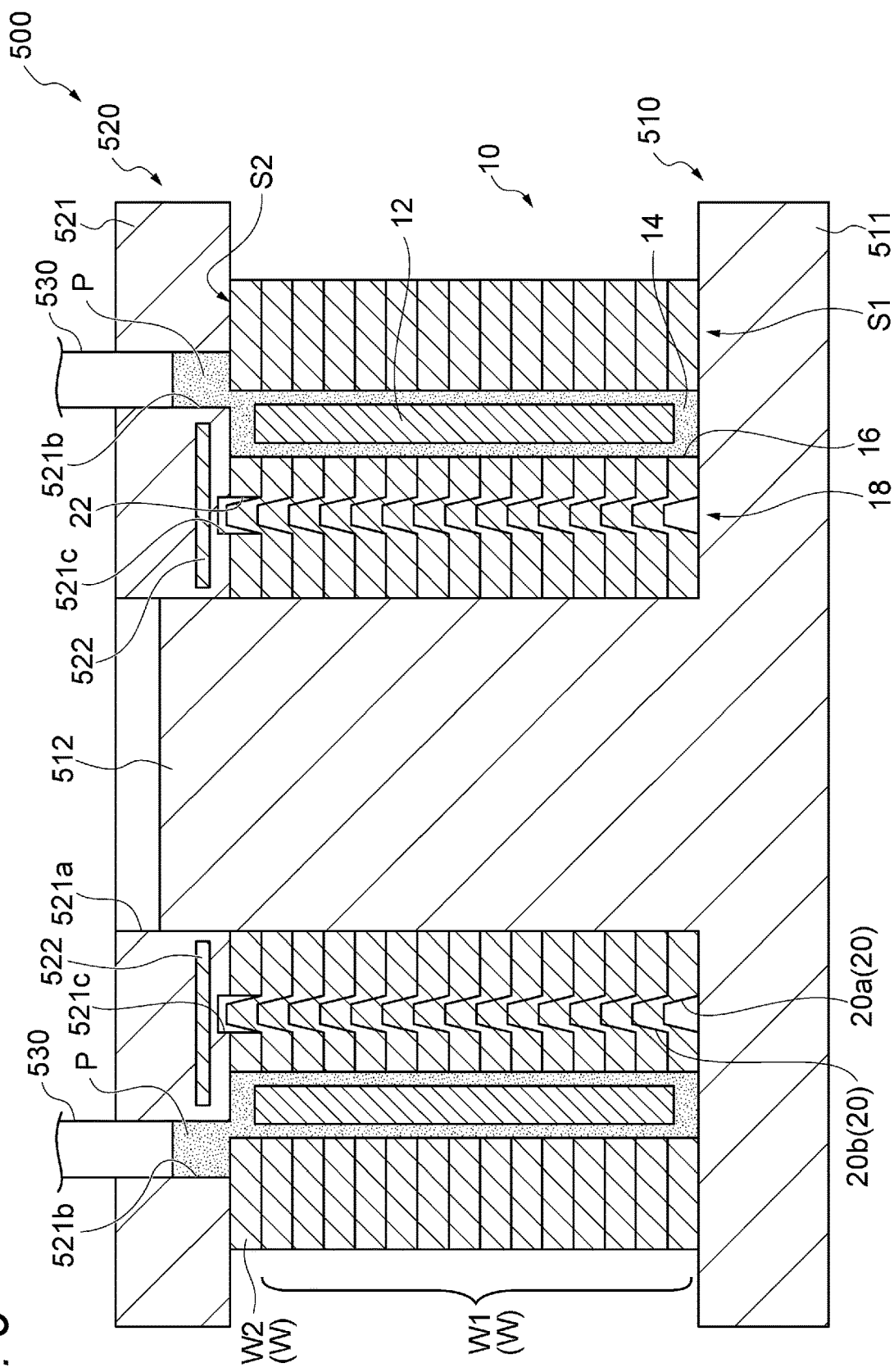
FIG. 6 is a cross-sectional view for showing a state where a permanent magnet is attached to a magnet-insert hole of the rotor laminated iron core by a magnet attachment device.

On the other hand, when the controller Ctr determines that the lamination thickness of the laminate 10 is within the predetermined standard (YES in step S15 of FIG. 7), the laminate 10 is conveyed to the magnet attachment device 500 in the inverted state and is placed on the lower die 510 (see FIG. 6). At this time, the upper end surface S1 of the laminate 10 abuts against the base member 511. Next, the permanent magnet 12 is inserted into each magnet-insert hole 16. The insertion of the permanent magnet 12 into each magnet-insert hole 16 may be performed manually or may be performed by a robot hand (not shown) or the like included in the magnet attachment device 500 based on the instruction signal of the controller Ctr.

Next, the upper die 520 is placed on the laminate 10. Thereafter, the laminate 10 is clamped from the lamination direction by the lower die 510 and the upper die 520, and is pressed with the load L3. At this time, the protrusion 20b protruding upward from the lower end surface S2 of the laminate 10 is accommodated in the recessed portion 521c of the upper die 520, and the lower end surface S2 is abutted against the upper die 520.

Next, the resin pellets P are put into each accommodation hole 521b. When the resin pellets P are melted by the built-in heat source 522 of the upper die 520, the molten resin is injected into each magnet-insert hole 16 by the plunger 530. At this time, the laminate 10 is heated at, for example, about 150° C. to 180° C. by the built-in heat source 522. Thereafter, when the molten resin is solidified, the solidified resin 14 is formed in the magnet-insert hole 16. Therefore, the permanent magnet 12 is attached to the laminate 10 together with the solidified resin 14 (see step S17 of FIG. 7). When the lower die 510 and the upper die 520 are removed from the laminate 10, the rotor laminated iron core 1 is completed.

Effect

In the present embodiment as described above, when the lamination thickness of the laminate 10 is measured by the lamination thickness measuring device 400, the protrusion 20b protruding from the lower end surface S2 is not in contact with the clamping member 401. That is, the laminate 10 is placed on the clamping member 401 in a state where the upper end surface S1, on which no protrusion 20b protrudes, faces downward. Therefore, the laminate 10 supported by the clamping member 401 does not become unstable during the lamination thickness measurement process. Therefore, the lamination thickness measurement process can be favorably performed after the process of forming the laminate 10 by the blanking device 130.

In the present embodiment, when the permanent magnet 12 is attached to the magnet-insert hole 16 of the laminate 10 by the magnet attachment device 500, the protrusion 20b protruding from the lower end surface S2 is not in contact with the lower die 510 (the base member 511). That is, the laminate 10 is placed on the lower die 510 in the state where the upper end surface S1, on which no protrusion 20b protrudes, faces downward. Therefore, the laminate 10 supported by the lower die 510 does not become unstable during the magnet attachment process. Therefore, the magnet attachment process can be favorably performed after the process of forming the laminate 10 by the blanking device 130.

In the present embodiment, the laminate 10 formed by the blanking device 130 is inverted by the inverting device 300 such that the lower end surface S2 faces upward and the protrusion 20b protrudes upward. Therefore, in the subsequent lamination thickness measurement process or the magnet attachment process, the upper end surface S1, on which no protrusion 20b protrudes, is abutted against the upper surface (support surface) of the clamping member 401 or the lower die 510. Accordingly, the laminate 10 can be more stably supported by the clamping member 401 or the lower die 510.

In the present embodiment, the caulk 20 is a V-shaped caulk, and the protrusion amount of the protrusion 20b from the lower end surface S2 tends to be larger. However, as described above, the laminate 10 is placed on the clamping member 401 or the lower die 510 in the state where the upper end surface S1, on which no protrusion 20b protrudes, faces downward. Therefore, even though the laminate 10 includes the V-shaped caulk, the laminate 10 can be more stably supported by the clamping member 401 or the lower die 510.

In the present embodiment, the load L1 with which the temporary laminate 11 is pressed is set to be equal to or greater than the load L3 during molding of the laminate 10 (for example, the injection of the molten resin into the magnet-insert hole 16). Therefore, since the temporary laminate 11 is sufficiently pressed, spring back is prevented during molding of the laminate 10. In other words, by setting the load L1 at the time of pressing the temporary laminate 11 to be equal to or greater than the load L3 at the time of molding the laminate 10, the lamination thickness of the laminate 10 is less likely to change before and after the molding of the laminate 10. Accordingly, the molding process after the pressing process can be favorably performed.

Modification

Although the embodiment according to the present disclosure has been described above in detail, various modifications may be made to the above embodiment within the scope of the gist of the invention.

(1) Although the laminate 10 formed by the blanking device 130 is inverted by the inverting device 300 and then conveyed to the lamination thickness measuring device 400 and the magnet attachment device 500 in the above embodiment, the manufacturing device 100 may not include the inverting device 300, and the laminate 10 may be conveyed to the lamination thickness measuring device 400 and the magnet attachment device 500 in the upright state without inverting the laminate 10. Specifically, as shown in FIG. 8, the clamping member 401 may include a plurality of opening portions 401a. Each of the plurality of opening portions 401a is capable of accommodating the protrusion 20b protruding downward from the lower end surface S2 of the laminate 10. The opening portions 401a may be through holes that penetrate the clamping member 401, or may be recesses provided on the upper surface of the clamping member 401. Alternatively, one opening portion that can accommodate all of a plurality of the protrusions 20b protruding downward from the lower end surface S2 of the laminate 10 may be provided in the clamping member 401. The opening portion may be, for example, an annular recessed groove. An opening portion similar to the opening portion 401a of the clamping member 401 may be provided in the base member 511 of the lower die 510 of the magnet attachment device 500. In these cases, since the protrusion 20b of the caulk 20 is accommodated in the opening portion 401a, a flat surface of the lower end surface S2 excluding the protrusion 20b is abutted against the upper surface (support surface) of the clamping member 401 or the lower die 510 in the subsequent lamination thickness measurement process or the magnet attachment process. Accordingly, the laminate 10 can be more stably supported by the clamping member 401 and the base member 511 without performing the process of inverting the laminate 10.

(2) Although the base member 521 of the upper die 520 is provided with the plurality of recessed portions 521c in the above embodiment, one opening portion capable of accommodating all of the plurality of protrusions 20b protruding upward from the lower end surface S2 of the laminate 10 may be provided in the base member 521. The opening portion may be, for example, an annular recessed groove.

(3) In a case where the upper die 520 is not provided with the recessed portion 521c, the protrusion 20b protruding from the lower end surface S2 of the laminate 10 may be abutted against a lower surface of the upper die 520.

(4) An opening portion may be provided in the lower surface of the clamping member 402, and the protrusion 20b may be accommodated in the opening portion when the clamping members 401, 402 clamp the laminate 10. At this time, the lower end surface S2 of the laminate 10 excluding the protrusion 20b abuts against the lower surface of the clamping member 402.

(5) As shown in FIGS. 9A to 9C, the manufacturing device 100 may further include a caulk measuring device 600 which includes a support member 601 and a sensor 602. The protrusion amount of the protrusion 20b of the caulk 20 or a depth of the recess 20a of the caulk 20 may be measured by the caulk measuring device 600. The support member 601 is not particularly limited as long as the laminate 10 can be supported, and may be, for example, a rectangular flat plate. The sensor 602 may be, for example, a non-contact type or contact type distance sensor.

Specifically, as shown in FIG. 9A, the laminate 10 in the inverted state inverted by the inverting device 300 may be placed on the support member 601, and the protrusion amount of the protrusion 20b protruding upward may be measured by the sensor 602 from above the laminate 10. As shown in FIG. 9B, the laminate 10 in the upright state may be placed on the support member 601, and the depth of the recess 20a included in the upper end surface S1 which faces upward may be measured by the sensor 602 from above the laminate 10. As shown in FIG. 9C, a plurality of through holes 601a capable of accommodating the protrusion 20b of the caulk 20 may be provided in the support member 601. The laminate 10 in the upright state may be placed on the support member 601 such that each protrusion 20b is located in each through hole 601a, and the protrusion amount of the protrusion 20b protruding downward may be measured by the sensor 602 from below the support member 601. In these cases, whether the lower end surface S2 faces upward or downward can be determined based on detection of presence of the protrusion 20b or the recess 20a performed by the sensor 602.

When the lamination thickness of the laminate 10 is larger than the standard, at least one blanked member W may be removed (peeled off) from the laminate 10 so as to adjust the lamination thickness. However, if the blanked member W is erroneously removed from the side of the lower end surface S2 of the laminate 10, the blanked member W2 provided with the through hole 22 may be removed. Therefore, since the entire protrusion 20b inserted in the through hole 22 is exposed to outside, the protrusion amount of the protrusion 20b from the lower end surface S2 of the laminate 10 is increased. In this case, the laminate 10 may be in a more unstable state. At this time, whether the blanked member W is erroneously removed from the side of the lower end surface S2 can be determined based on detection of a change in the protrusion amount of the protrusion 20b performed by the sensor 602 as described above.

(6) Although the lamination thickness of the laminate 10 is measured after the formation of the laminate 10 and before the molding of the laminate 10 in the above embodiment, the lamination thickness measurement process of the laminate 10 may be performed at any time after the formation of the laminate 10. For example, the lamination thickness of the laminate 10 may be measured after the molding of the laminate 10. In this case, the lamination thickness of the laminate 10 is also measured after the temporary laminate 11 is pressed with the load L1 such that the lamination thickness of the laminate 10 is difficult to be changed, so that the lamination thickness of the laminate 10 can be measured more accurately.

(7) Although the molding process is performed on the laminate 10 in the above embodiment, other processes may also be performed on the laminate 10. For example, a welding process may be performed on a peripheral surface of the laminate 10, or an identification code may be formed on a surface of the laminate 10 (engraving process).

In a case where the welding process is performed on the laminate 10, the plurality of blanked members W are joined by welding beads. If the temporary laminate 11 is subjected to the welding process while being pressed with the load L3 without being subjected to the pressing process, the plurality of blanked members W are joined together by the welding beads in the state where the gap between the plurality of blanked members W is reduced to some extent. However, since the plurality of blanked members W tends to expand in the lamination direction due to the spring back, damage (cracks or the like) may occur in the welding beads. However, since the lamination thickness of the laminate 10 of the present disclosure hardly changes before and after the processing of the laminate 10, the damage to the welding beads is less likely to occur.

In the case where the engraving process is performed on the laminate 10, the identification code is formed by irradiating the surface (for example, an upper end surface or a lower end surface) of the laminate 10 with a laser beam. If the temporary laminate 11 is not subjected to the pressing process, since the lamination thickness of the laminate 10 is not stable, a distance between a laser light source and the laminate 10 may vary when the laminate is irradiated with the laser beam to form the identification code on the surface of the laminate 10. Therefore, quality of the identification code may vary. However, since the lamination thickness of the laminate 10 of the present disclosure hardly changes before and after the processing of the laminate 10, the quality of the identification code formed on the surface of the laminate 10 can be favorably maintained. It should be noted that the laminate 10 is preferably pressed with a predetermined load (for example, the load L3) during the engraving process of the laminate 10.

The identification code has a function of holding individual information for identifying an individual of the rotor laminated iron core 1 which is provided with the identification code (for example, product type, manufacturing date and time, materials used therein or manufacturing line). The identification code is not particularly limited as long as the individual information can be held by a combination of bright patterns and dark patterns, and may be, for example, a bar code or a two-dimensional code. The two-dimensional code may be, for example, a QR code (registered trademark), Data Matrix or Vericode. Alternatively, the identification code may also be configured by combining various other colors in addition to white and black as long as contrast thereof can be improved. For example, the identification code may be a layered two-dimensional code (a two-dimensional shape code obtained by multi-layering color information). The layered two-dimensional code may be, for example, a PM code (registered trademark).

(8) Although the laminate 10 is inverted by the inverting device 300 after the temporary laminate 11 is pressed by the pressing device 200 to form the laminate 10 in the above embodiment, the temporary laminate 11 may also be pressed by the pressing device 200 to form the laminate 10 after the temporary laminate 11 is inverted by the inverting device 300.

(9) The manufacturing device 100 may not include the pressing device 200, and the pressing of the temporary laminate 11 performed by the pressing device 200 may not be performed.

Figure 10:
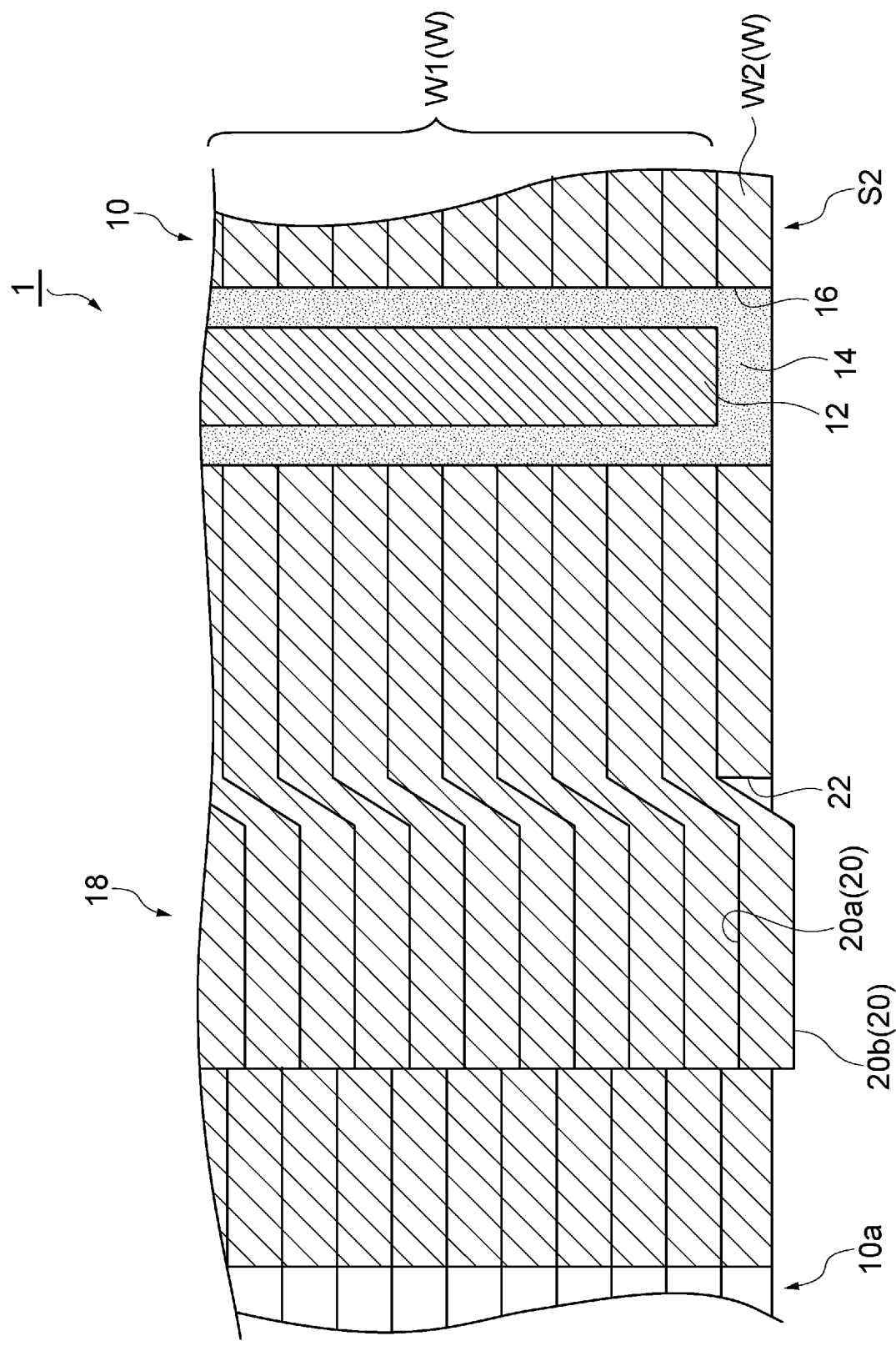
FIG. 10 is a partial cross-sectional view showing another example of the rotor laminated iron core.

(10) The caulk 20 for interlocking the blanked members W may be a so-called cut-and-raised caulk as shown in FIG. 10. The cut-and-raised caulk is constituted by cut-and-raised pieces partially cut from the electromagnetic steel plate ES. A tip end portion of the cut-and-raised piece is fitted to an inner peripheral surface of the through hole 22 of the adjacent blanked member W2 or the cut-and-raised piece of the adjacent blanked member W to interlock the plurality of blanked members W with each other. In this case, the protrusion amount of the protrusion 20b from the lower end surface S2 also tends to become larger. As described above, even though the laminate 10 includes the cut-and-raised caulk, the laminate 10 can be more stably supported.

(11) The caulk 20 for interlocking the blanked members W to each other may be a so-called round caulk which has a cylindrical shape.

(12) A magnet set in which two or more permanent magnets 12 are combined may be inserted into each magnet-insert hole 16. In this case, in one magnet-insert hole 16, the plurality of permanent magnets 12 may be arranged in a longitudinal direction of the magnet-insert hole 16. In the one magnet-insert hole 16, the plurality of permanent magnets 12 may also be arranged in an extending direction of the magnet-insert hole 16. In the one magnet-insert hole 16, a plurality of permanent magnets 12 may be arranged in the longitudinal direction while a plurality of permanent magnets 12 may be arranged in the extending direction.

(13) In the above embodiment, the resin pellet P accommodated in the accommodation hole 421b of the upper die 420 is melted by the built-in heat source 422, and the molten resin is injected into the magnet-insert hole 16 into which the permanent magnet 12 is inserted. However, the permanent magnet 12 may also be held in the magnet-insert hole 16 by various other methods. For example, the magnet-insert hole 16 may be filled with resin by heating the laminate 10 in a state where the permanent magnet 12 and the resin pellet P are inserted into the magnet-insert hole 16 and melting the resin pellet P therein. Moreover, for example, the magnet-insert hole 16 may be filled with resin by inserting the heated permanent magnet 12 into the magnet-insert hole 16 in a state where the resin pellet P is inserted into the magnet-insert hole 16 and melting the resin pellet P by heat of the permanent magnet 12.

(14) Although the rotor laminated iron core 1 is described in the above embodiment, the present invention may also be applied to a stator laminated iron core. In this case, the stator laminated iron core may be a split stator laminated iron core in which a plurality of iron core pieces are combined or a non-split stator laminated iron core.

SUMMARY

Example 1. The manufacturing method of the laminated iron core (1) according to one example of the present disclosure includes: laminating the plurality of blanked members (W) to form the laminate (10), the laminate (10) including the pair of (first and second) end surfaces (S2, S1), the plurality of blanked members (W) being interlocked by the caulk (20) in the lamination direction of the laminate (10), and the laminate (10) being formed such that the protrusion (20b) of the caulk (20) protrudes downward from the first end surface (S2) in a downward state; placing the laminate (10) on the support (401, 510) such that the protrusion (20b) is not in contact with the support surface of the support (401, 510); and processing the laminate (10) in a state where the laminate (10) is placed on the support (401, 510). In this case, the protrusion (20b) of the caulk (20) is not in contact with the support surface of the support (401, 510). Therefore, the laminate (10) placed on the support (401, 510) does not become unstable in subsequent processing. Accordingly, the subsequent processing can be favorably performed.

Example 2. In the method of Example 1, the placing of the laminate (10) on the support (401, 510) may include placing the laminate (10) on the support (401, 510) after the laminate (10) is inverted such that the first end surface (S2) faces upward and the protrusion (20b) protrudes upward. In this case, the second end surface (S1) on the side where no protrusion (20b) protrudes abuts against the support surface of the support (401, 510). Therefore, the laminate (10) can be more stably supported by the support (401, 510).

Example 3. In the method of Example 1, the placing of the laminate (10) on the support (401) may include supporting the end surface (S2) of the laminate on the support surface such that the protrusion is located in the opening portion (401a) provided in the support surface of the support (401). In this case, since the protrusion (20b) of the caulk (20) is accommodated in the opening portion (20a), the first end surface (S2) on the side where the protrusion (20b) protrudes abuts against the support surface of the support (401). Therefore, the laminate (10) can be more stably supported by the support (401).

Example 4. In the method of any one of Examples 1 to 3, the caulk (20) may be a V-shaped caulk or a cut-and-raised caulk. In this case, even if the laminate includes the V-shaped caulk or cut-and-raised caulk whose protrusion (20b) tends to have a larger protrusion amount, the laminate can be more stably supported by the support (401, 510).

Example 5. The method of any one of Examples 1 to 4 may further include measuring the protrusion amount of the protrusion (20b) from the first end surface (S2). In this case, it can be determined whether the first end surface (S2) faces upward or downward based on detection of presence of the protrusion (20b). Moreover, when the lamination thickness of the laminate (10) is larger than the standard, at least one blanked member (W) may be removed (peeled off) from the laminate (10) so as to adjust the lamination thickness, and whether the blanked member (W) is erroneously removed from the side of the first end surface (S2) can be determined based on detection of a change in the protrusion amount of the protrusion (20b).

Example 6. The method of any one of Examples 1 to 5 may further include measuring the depth of the recess (20a) of the caulk (20) on the second end surface (S1). In this case, it can be determined whether the second end surface (S1) faces upward or downward based on detection of presence of the recess (20a).

Example 7. The method of any one of Examples 1 to 6 may further include pressing the laminate (11) with the first load (L1). The processing of the laminate (10) may include: processing the laminate (10) while the laminate (10) is pressed with the second load (L3) which is equal to or lower than the first load (L1) after the laminate (10) is pressed with the first load (L1). In this case, the first load (L1) by which the laminate (11) is pressed is equal to or greater than the second load (L3) at the time of processing the pressed laminate (10). Therefore, since the laminate (11) is sufficiently pressed, spring back is prevented during the processing of the pressed laminate (10). In other words, by setting the load (first load L1) at the time of pressing the laminate (11) to be equal to or greater than the load (second load L3) at the time of processing the pressed laminate (10), the lamination thickness of the pressed laminate (10) is less likely to change before and after the processing. Accordingly, the processing after the pressing process can be favorably performed.

This application is based on JP2018-041009 filed on Mar. 7, 2018, the contents of which are incorporated herein by reference.

INDUSTRIAL APPLICABILITY

According to the manufacturing method of the laminated iron core according to the present disclosure, the subsequent processing can be favorably performed after the laminate is interlocked by the caulk.

REFERENCE SIGNS LIST

1 . . . rotor laminated iron core, 10 . . . laminate, 11 . . . temporary laminate (laminate), 18 . . . caulk portion, 20 . . . caulk, 22 . . . through hole, 20a . . . recess, 20b . . . protrusion, 100 . . . manufacturing device of rotor laminated iron core, 130 . . . blanking device, 200 . . . pressing device, 300 . . . inverting device, 400 . . . lamination thickness measuring device, 401 . . . clamping member (support), 401a . . . opening portion, 500 . . . magnet attachment device, 510 . . . lower die (support), 600 . . . caulk measuring device,

601 ... support member, 602 ... sensor, Ctr ... controller (control unit), L1 ... load (first load), L3 ... load (second load), S1 ... upper end surface (second end surface), S2 ... lower end surface (first end surface), W, W1, W2 ... blanked member.

The invention claimed is:

1. A manufacturing method of a laminated iron core by laminating a plurality of blanked members to form a laminate, the laminate including a first end surface, which has a through hole, and a second end surface, one of the plurality of blanked members providing the first end surface, and the plurality of blanked members being interlocked by a caulk in a lamination direction of the laminate, the manufacturing method comprising:

forming the laminate such that a protrusion of the caulk of another of the plurality of blanked members that is adjacent the one of the plurality of blanked members extends by at least a length of the through hole to define an extended protrusion, and the extended protrusion protrudes downward from the through hole of the first end surface;

placing the laminate on a support such that the extended protrusion is not in contact with a support surface of the support; and processing the laminate in a state where the laminate is placed on the support.

2. The manufacturing method according to claim 1, wherein the placing of the laminate on the support includes placing the laminate on the support after the laminate is inverted such that the first end surface faces upward and the extended protrusion protrudes upward.

3. The manufacturing method according to claim 1, wherein the placing of the laminate on the support includes supporting the first end surface of the laminate on the support surface such that the extended protrusion is located inside an opening portion provided in the support surface of the support.

4. The manufacturing method according to claim 1, wherein the caulk is a V-shaped caulk or a cut-and-raised caulk.

5. The manufacturing method according to claim 1, further comprising:

measuring a protrusion amount of the extended protrusion from the first end surface.

6. The manufacturing method according to claim 1, further comprising:

measuring a depth of a recess of the caulk on the second end surface.

7. The manufacturing method according to claim 1, further comprising:

pressing the laminate with a first load, wherein the processing of the laminate includes: processing the laminate while pressing the laminate with a second load after the pressing of the laminate with the first load, the second load being equal to or lower than the first load.

* * * * *